(12) United States Patent
Zhu (10) Patent No.: US 11,936,313 B2
(45) Date of Patent: Mar. 19, 2024

(54) METHOD OF ALIGNING A ROTOR OF A SYNCHRONOUS MOTOR AT A SPECIFIED ROTOR ANGLE AND A CONTROLLER THEREFOR

(71) Applicant: Kinetic Technologies International Holdings LP, Toronto (CA)

(72) Inventor: Feng Zhu, Wanchai (HK)

(73) Assignee: Kinetic Technologies International Holdings LP, Toronto (CA)

( * ) Notice: Subject to any disclaimer, the term of this patent is extended or adjusted under 35 U.S.C. 154(b) by 48 days.

(21) Appl. No.: 17/462,846

(22) Filed: Aug. 31, 2021

(65) Prior Publication Data

US 2023/0063914 A1    Mar. 2, 2023

(51) Int. Cl.
    *H02P 21/00*    (2016.01)
    *H02P 21/22*    (2016.01)
    (Continued)

(52) U.S. Cl.
    CPC ............. *H02P 21/22* (2016.02); *H02P 27/08* (2013.01); *H02P 21/13* (2013.01)

(58) Field of Classification Search
    CPC .................................. H02P 21/22; H02P 27/08
    (Continued)

(56) References Cited

U.S. PATENT DOCUMENTS

| 4,088,934 A * | 5/1978 | D'Atre | ................. | B60L 15/025 |
| | | | | 318/808 |
| 8,018,187 B2 * | 9/2011 | Schulz | .................... | H02P 21/32 |
| | | | | 318/722 |

(Continued)

FOREIGN PATENT DOCUMENTS

| CN | 110661466 A | 1/2010 |
| CN | 102684595 A | 9/2012 |

(Continued)

OTHER PUBLICATIONS

PCT International Search Report and the Written Opinion dated Oct. 10, 2022, issued in related International Application No. PCT/CN2022/106537 (9 pages).

(Continued)

*Primary Examiner* — Erick D Glass
(74) *Attorney, Agent, or Firm* — Sheppard Mullin Richter & Hampton LLP (57) ABSTRACT

Described is a method of aligning a rotor of a polyphase synchronous motor having a permanent magnet rotor to a predetermined, selected, or specified rotor angle. The method comprises sensing or measuring the stator winding voltages/currents during synchronous operation of the motor. Based on the sensed or measured stator winding voltages/currents, a synchronously rotating reference frame vector voltage ($V_q$) in the q-axis is determined as a product of stator winding resistance ($R_s$) and stator winding current ($i_q$) in the q-axis. Corresponding polyphase drive voltages for the synchronous motor for the predetermined, selected, or specified rotor angle ($\theta$) are determined from the synchronously rotating reference frame vector voltage ($V_q$). The polyphase drive voltages are applied to align the rotor on stopping at said predetermined, selected, or specified rotor angle ($\theta$). The polyphase drive voltages are applied by suitable PWM drive signals.

20 Claims, 8 Drawing Sheets

(51) Int. Cl.
*H02P 27/08* (2006.01)
*H02P 21/13* (2006.01)

(58) Field of Classification Search
USPC .................................................. 318/400.02
See application file for complete search history.

(56) References Cited

U.S. PATENT DOCUMENTS

| | | | |
|---|---|---|---|
| 11,183,957 B2 | 11/2021 | Tsai et al. | |
| 2004/0257027 A1* | 12/2004 | Matsuo | H02P 21/26 318/722 |
| 2010/0283252 A1 | 11/2010 | Fradella | |
| 2010/0320953 A1* | 12/2010 | Yeh | H02P 21/06 318/490 |
| 2013/0175955 A1* | 7/2013 | Son | H02P 21/14 318/400.02 |
| 2015/0291207 A1* | 10/2015 | Ballal | B62D 5/0463 701/41 |
| 2018/0109218 A1 | 4/2018 | Huh et al. | |
| 2021/0111647 A1* | 4/2021 | Kalygin | H02P 21/22 |
| 2022/0190762 A1* | 6/2022 | Liu | H02P 25/024 |

FOREIGN PATENT DOCUMENTS

| | | |
|---|---|---|
| CN | 111193451 A | 5/2020 |
| TW | 202112051 A | 3/2021 |

OTHER PUBLICATIONS

Wei Xu et al., "Improved Rotor flux Observer for Sensoness Control of PMSM With Adoptive Harmonic Elimination and Phase Compensation", CES Transactions, vol. 3, Jun. 2019.
"Sensorless PMSM Field-Oriented Control" DRM148, Freescale Semiconductor Inc., 2016.
Zambada, Jorge, "Sensorless Field Oriented Control of PMSM Motors": AN1078, Microchip Technology Inc., 2007.
Search Report dated Mar. 31, 2023, issued in related Taiwan Application No. 111130669 (2 pages).

* cited by examiner

METHOD OF ALIGNING A ROTOR OF A SYNCHRONOUS MOTOR AT A SPECIFIED ROTOR ANGLE AND A CONTROLLER THEREFOR

FIELD OF THE INVENTION

The invention relates to a method of aligning a rotor of a synchronous motor to a predetermined, selected, or specified rotor angle and a controller therefor. The method relates particularly, but not inclusively to a method of aligning a rotor of a permanent magnet synchronous motor (PMSM) having a sensorless closed-loop control system for synchronous operation to a predetermined, selected, or specified rotor angle.

BACKGROUND OF THE INVENTION

The most common types of multi-phase, e.g., three-phase, motors are synchronous motors and induction motors. When three-phase electric conductors are placed in certain geometrical positions, which means at a certain angle from one another, an electrical field is generated. The rotating magnetic field rotates at a certain speed known as the synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets in the rotor to provide a constant magnetic flux which has a sinusoidal back-electromotive force (emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors. BLDC motors can be considered as synchronous DC motors which use a controller having a power stage including a DC voltage supply, suitably converted, to produce the stator rotating magnetic field. BLDC motors therefore use the same or similar control algorithms as AC synchronous motors, especially PMSM motors.

Previously, it has been common in synchronous motor control systems to use at least one sensor, such as a Hall sensor, to detect the rotational position of the rotor during synchronous operation. However, sensorless motor control systems are now preferred.

Such sensorless motor control systems typically include a rotor position and speed estimation module where, during synchronous operation, rotor position and speed can be continuously estimated based on the back-emf induced by the rotating rotor. The estimated rotor positions and speeds are utilized to update and/or compensate the motor control signals during synchronous operation thereby providing sensorless closed-loop synchronous operation motor control.

One problem with sensorless motor control systems is that, when the motor has stopped, the position of the rotor is unknown. This can lead to significant issues on start-up of the motor including possible reverse rotation of the rotor which is not acceptable for some motor applications.

Figure 1:
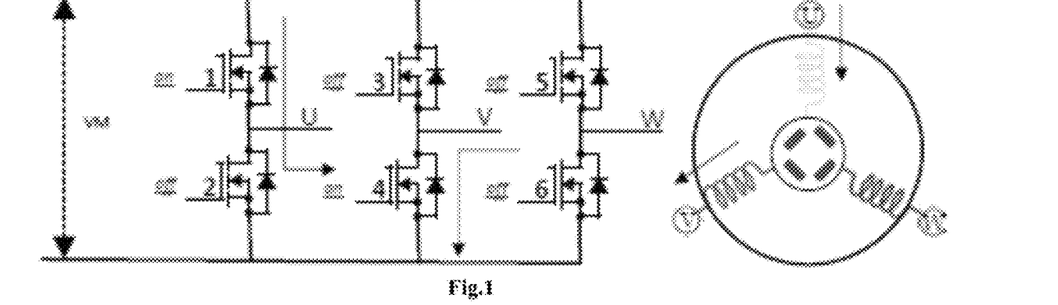
FIG. 1 is a block schematic diagram illustrating a synchronous motor with a closed-loop controller illustrating a known method of parking a rotor in a fixed rotor position.

FIG. 1 is a block schematic diagram illustrating a three-phase synchronous motor with a closed-loop controller illustrating a known method of parking a rotor of the motor in a fixed rotor position. In this case, the rotor is aligned on stopping to one fixed rotor position. This is achieved by injecting direct current (DC) into two of the three motor phases. In the example, shown, DC is injected into the U and V phases. As also shown in FIG. 1, DC injection is implemented by switching on an upper side drive transistor (denoted as "1" in FIG. 1) for the U phase and switching on a lower side drive transistor (denoted as "4" in FIG. 1) for the V phase. Neither of the drive transistors of the W phase are switched on. This method allows no variation or selection in the fixed rotor stop position.

Among other things, what is therefore desired is an improved method of aligning the rotor to a predetermined, selected, or specified rotor angle.

OBJECTS OF THE INVENTION

An object of the invention is to mitigate or obviate to some degree one or more problems associated with known methods of aligning the rotor to a predetermined, selected, or specified rotor angle.

The above object is met by the combination of features of the main claims; the sub-claims disclose further advantageous embodiments of the invention.

Another object of the invention is to provide a method of aligning the rotor to a predetermined, selected, or specified rotor angle for a PMSM having a sensorless closed-loop control system for synchronous operation.

Another object of the invention is to provide an improved method of starting a synchronous motor having a sensorless closed-loop control system for synchronous operation.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of aligning a rotor of a polyphase synchronous motor having a permanent magnet rotor to a predetermined, selected, or specified rotor angle. The method comprises sensing or measuring the stator winding voltages/currents during synchronous operation of the motor. Based on the sensed or measured stator winding voltages/currents, a synchronously rotating reference frame vector voltage ($V_q$) in the q-axis of the synchronously rotating reference frame is determined as a product of stator winding resistance ($R_s$) and stator winding current ($i_q$) in the q-axis. Corresponding polyphase drive voltages for the synchronous motor for the predetermined, selected, or specified rotor angle (θ) are determined from the synchronously rotating reference frame vector voltage ($V_q$). The polyphase drive voltages are applied to align the rotor on stopping at said predetermined, selected, or specified rotor angle (θ). The polyphase drive voltages are preferably applied by suitable PWM drive signals.

In a second main aspect, the invention provides a closed-loop method of starting a synchronous motor having a permanent magnet rotor, the method comprising the method steps of the first main aspect of the invention and then controlling start-up of the motor using a closed-loop synchronous operation motor control algorithm based on the predetermined, selected, or specified rotor angle (θ).

In a third main aspect, the invention provides a closed-loop controller for a synchronous motor having a permanent magnet rotor, said controller comprising a non-transitory computer-readable medium storing machine-readable instructions and a processor, wherein, when the machine-readable instructions are executed by said processor, they configure the controller to park the rotor at a predetermined, selected, or specified rotor angle (θ) by implementing the method steps of the first main aspect of the invention.

In a fourth main aspect, the invention provides a synchronous motor including a closed loop controller according to the third main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the Figs. may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

References herein to "rotor angle" are to be taken as references to "rotor position". References herein to "stator angle" are to be taken as references to "commutation angle".

The method according to the invention determines the motor angle and initial speed directly from the stator winding currents/voltages. However, in the following description reference will be made to only stator currents.

The method of determining the motor angle and/or initial speed directly from the stator winding currents can comprise a first part of a control algorithm for starting and operating the synchronous motor. The invention therefore also relates to a method of and controller for starting a PMSM having a sensorless closed-loop controller for synchronous operation, but the method is applicable to any synchronous motor with a closed-loop controller for synchronous operation which utilizes the method as hereinafter described.

One advantage of the invention is that it can be implemented on an existing closed-loop controller for synchronous operation without significant modification save for changes in the controller's control algorithm or algorithms. The closed-loop control algorithm in accordance with the invention can be implemented by software, firmware, hardware, or any combination of the foregoing. It may be embodied as an application specific integrated circuit or chip.

Figure 2:
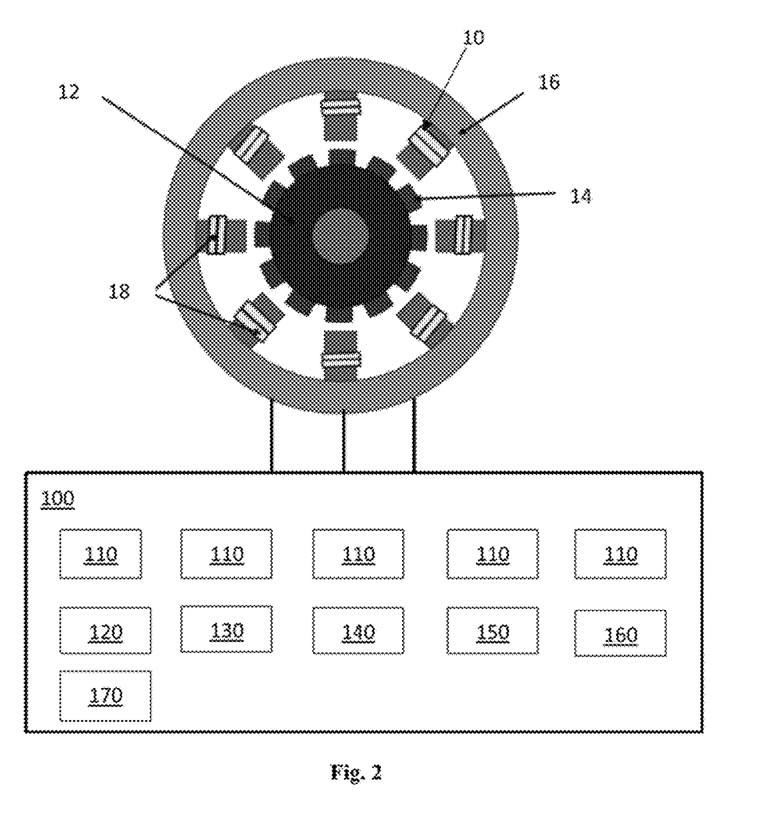
FIG. 2 is a block schematic diagram illustrating a synchronous motor with a closed-loop controller in accordance with the invention.

FIG. 2 shows an exemplary embodiment of an improved closed-loop controller 100 for a synchronous motor 10 in accordance with concepts of the present invention. The synchronous motor 10 has a permanent magnet rotor 12 with a plurality of permanent magnets 14 and a stator 16 with a plurality of stator windings 18. Whilst the synchronous motor 10 is shown with the stator 16 surrounding the rotor 12 in a conventional manner, it will be understood that the concepts of the present invention are equally applicable to a synchronous motor where the rotor surrounds the stator, i.e., the stator is arranged internally of the rotor.

In the illustrated embodiment, the closed-loop controller 100 may comprise a plurality of functional blocks 110 for performing various functions thereof. For example, the closed-loop controller 100 may comprise a suitably modified or suitably configured known vector-based closed-loop controller such as a direct torque control (DTC) closed-loop controller or a Field Oriented Control (FOC) closed-loop controller as described in the publication entitled "Sensorless Field Oriented Control of PMSM Motors" authored by Jorge Zambada, published by Microchip Technology Inc. in 2007 as paper AN1078, the content of which is incorporated herein by way of reference, and as illustrated in FIG. 2 herein but modified as described herein in accordance with the concepts of the invention.

The closed-loop controller 100 may, for example, be implemented using logic circuits and/or executable code/ machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the closed-loop controller 100 and/or utilize data provided thereby to perform functions of the closed-loop controller 100 as described herein. Additionally, or alternatively, the closed-loop controller 100 may comprise one or more special purpose processors (e.g., application specific integrated circuit (ASIC), field programmable gate array (FPGA), graphics processing unit (GPU), and/or the like configured to perform functions of the closed-loop controller 100 as described herein.

Figure 3:
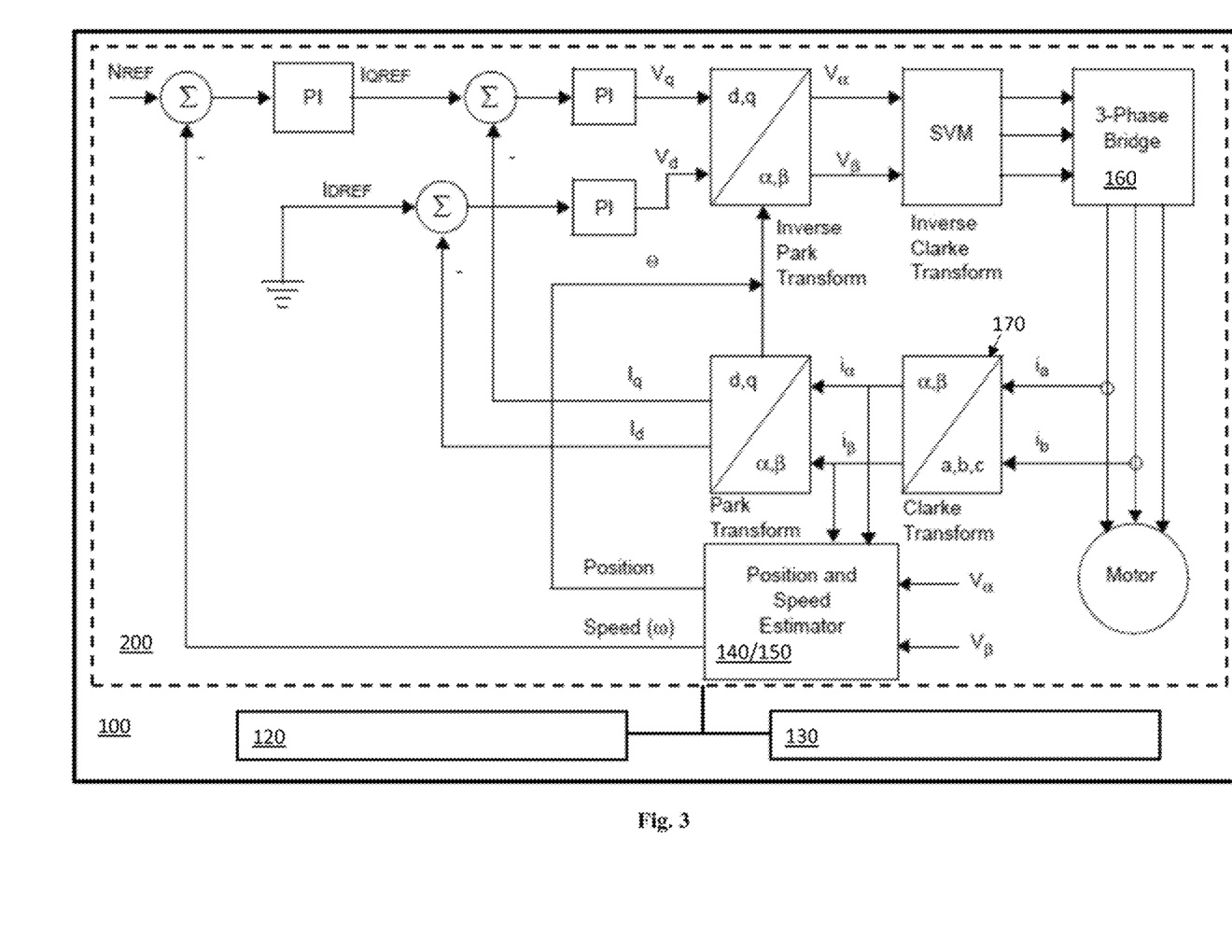
FIG. 3 is a detailed block schematic diagram of an embodiment of the closed-loop controller in accordance with the invention.

In a broad aspect, the invention comprises using the closed-loop controller 100 of FIGS. 2 and 3, e.g., using the modified FOC controller 200 of FIG. 3, to implement the method of aligning the rotor at a predetermined, selected, or specified rotor angle ($\theta$) on stopping of the motor. The closed-loop controller 100 may, as mentioned above, comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the method of determining the motor angle and/or initial speed directly from the stator winding currents.

In another broad aspect, a closed-loop method of starting a synchronous motor comprises first implementing the method steps of the first main aspect of the invention and then controlling start-up of the motor using a closed-loop synchronous operation motor control algorithm based on the predetermined, selected, or specified rotor angle ($\theta$).

The present invention therefore also seeks to supplement the known closed-loop method for operating a synchronous motor, especially a PMSM, by the method of parking the rotor on stopping of the motor at the predetermined, selected, or specified rotor angle ($\theta$) and subsequently using the parked rotor angle ($\theta$) as an input to the closed-loop operation method on motor start-up.

The modified or reconfigured closed-loop controller 100/ 200 of FIGS. 2 and 3 is arranged to start the synchronous motor 10 by energizing the stator windings 18 using motor control signals, to determine from synchronous operation parameters necessary to determine new motor control signals to then park the rotor on stopping at the predetermined, selected, or specified rotor angle ($\theta$).

Consequently, after synchronous operation of the motor, an initial standstill rotor angle on initiation of motor start-up may comprise the predetermined, selected, or specified rotor angle ($\theta$). The predetermined, selected, or specified rotor angle ($\theta$) is obtained when stopping the motor 10 after a preceding synchronous operation of the motor 10. The predetermined rotor angle ($\theta$) can be stored in the memory 130 and recalled when needed on initiation of start-up of the motor 10.

In some embodiments, the module 140 may comprise a rotor position and speed estimation module 140 of the modified FOC controller 200 of FIG. 3 and the predetermined, selected, or specified rotor angle (θ) determined in accordance with the invention may comprise an input to the module 140.

In some embodiments, the module 140 may comprise a rotor flux observer module 150 of a type as described in pages 1-3 of the publication entitled "improved Rotor Flux Observer for Sensorless Control of PMSM With Adaptive Harmonic Elimination and Phase Compensation" authored by Wei Xu et al, CES Transactions on Electrical Machines and Systems, vol. 3, no. 2, June 2019, the content of which is herein incorporated by reference.

The closed-loop motor operating method according to the invention can be utilized in synchronous motors 10 with various stator winding configurations as illustrated by FIGS. 4-5 and 10-13.

Figure 4:
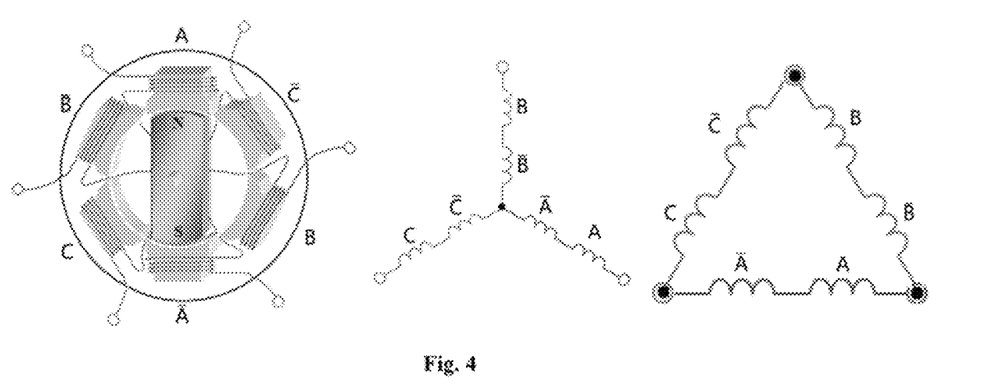
FIG. 4 is a schematic diagram showing the delta and star (or Y) stator windings configurations of a three-phase synchronous motor in which the closed-loop start-up method in accordance with the invention can be implemented.
Figure 5:
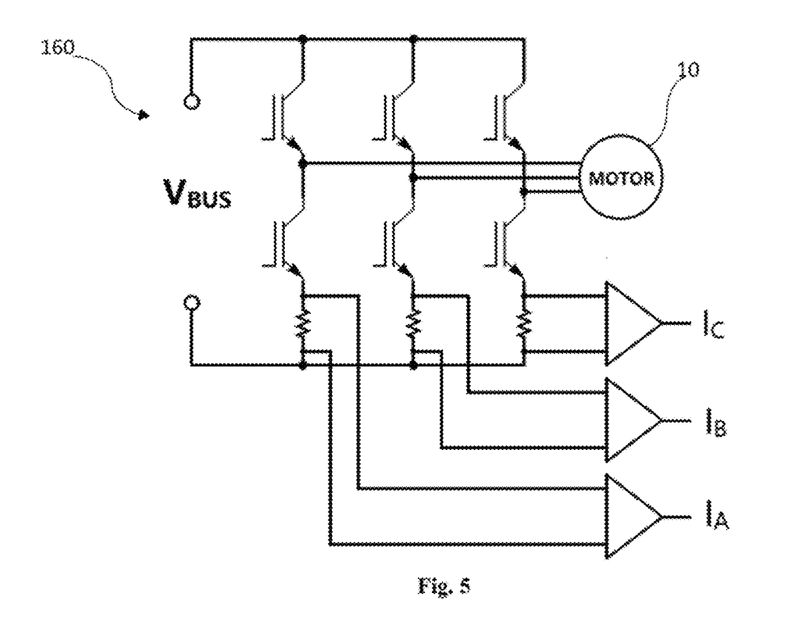
FIG. 5 is a schematic block diagram of a power stage for the closed-loop motor control system in accordance with the invention for the three-phase synchronous motor of FIG. 4.

FIG. 4 is a schematic diagram showing the conventional delta and star (or Y) stator windings configurations of the three-phase synchronous motor 10 whilst FIG. 5 provides a schematic block diagram of a three-phase power stage/bridge 160 for the closed-loop controller 100/200 for the synchronous motor 10 of FIG. 4. Two or more of the outputs of the 3-phase bridge module 160 of the closed-loop controller 100/200 of FIG. 5 comprising two or more of the sensed currents denoted as "$I_A$", "$I_B$" and "$I_C$" in FIG. 3 are fed to the Clarke Transform module 170 of the closed-loop controller 100/200 for processing. Typically, the sensed currents "$I_A$", "$I_B$" are selected for the Clarke Transform module 170.

Figure 6:
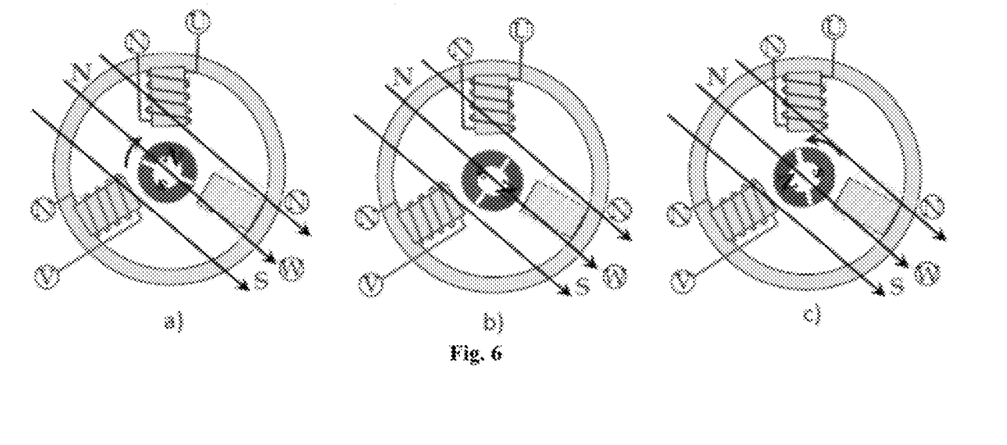
FIG. 6 illustrates alignment of rotor and stator magnetic fields in a three-phase synchronous motor.

FIG. 6 illustrates alignment of rotor and stator magnetic fields in the three-phase synchronous motor 10. The torque produced by the motor 10 includes a reaction torque component created by the reaction between the permanent magnets 14 of the rotor 12 and the stator windings 18 and a reluctance torque component generated as a result of the magnetic field minimizing the reluctance of its flux path. Both of these torque components are a function of the alignment between the rotor 12 and the stator 16. When the flux created by the stator 16 passes through the axis of the rotor 12, the rotor 12 and the stator 16 magnetic fields are in alignment as illustrated by FIG. 6 *a*) to *c*). In FIG. 6*a*), the rotor 12 is aligned with the U stator winding 18. In FIG. 6*b*), the rotor 12 is aligned with the W stator winding 18. In FIG. 6*c*), the rotor 12 is aligned with the V stator winding 18.

Figure 7:
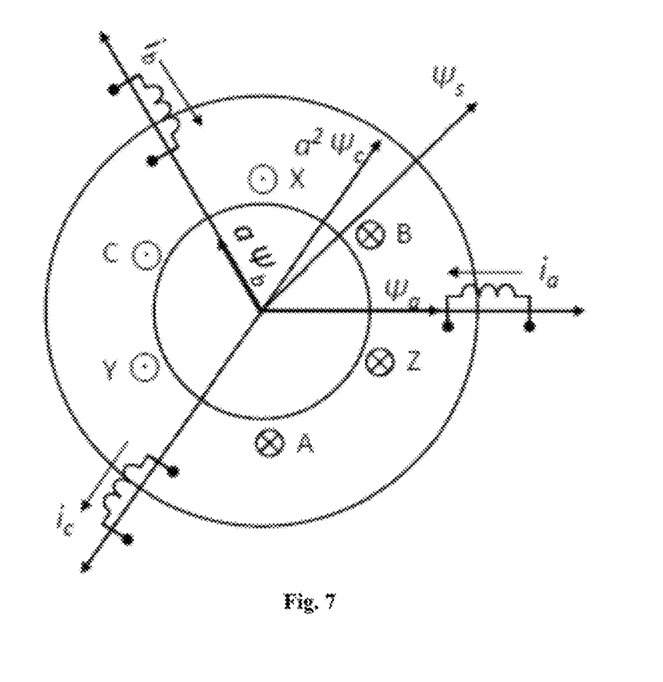
FIG. 7 is a vector current diagram for a three-phase synchronous motor.

FIG. 7 is the vector current diagram for the three-phase synchronous motor 10. The stator windings 18 are spatially separated by 120°. When the motor 10 is operating and the three phases U, V, W are being driven, the three phase currents $i_a$, $i_b$, $i_c$ are also separated in phase by 120°. The stator vector current ($i_s$) in the synchronously rotating two-dimensional (2D) orthogonal reference frame (d-q) is given by:

$$i_s = \sqrt{\frac{2}{3}}(i_a + a\, i_b + a^2 i_c).$$

Figure 8A:
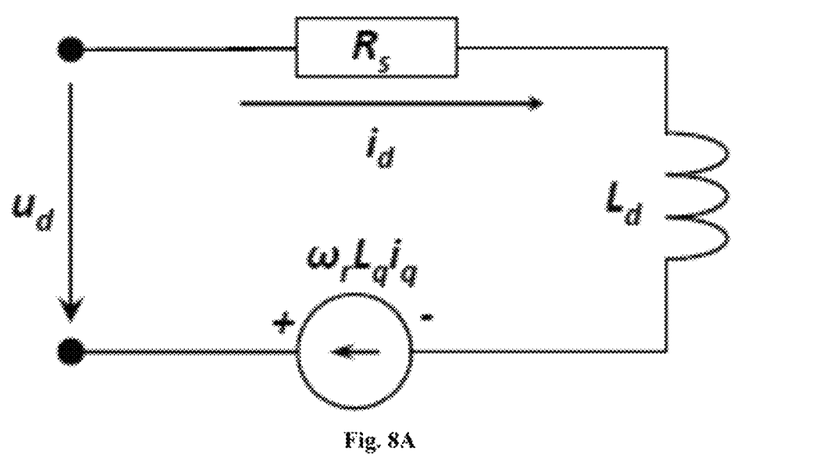
FIG. 8A is a voltage equivalent circuit in the d-axis for a three-phase synchronous motor and FIG. 8B is a voltage equivalent circuit in the q-axis for the three-phase synchronous motor.
Figure 8B:
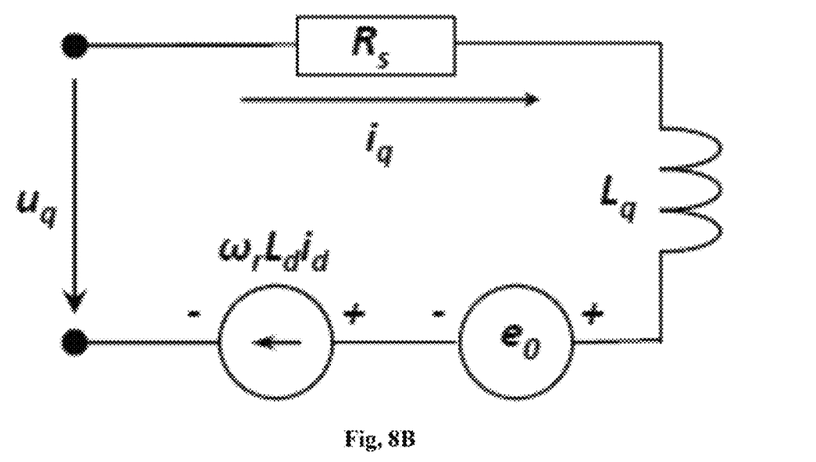

The vector flux of the stator 16 in the synchronously rotating 2D orthogonal reference frame (d-q) is given by:

$\Psi_a = \Psi \cos(\varphi) e^{j0°}$ $\Psi_b = \Psi \cos(\varphi - 120°) e^{j120°}$ $\Psi_c = \Psi \cos(\varphi - 240°) e^{j240°}$ FIG. 8A provides the voltage equivalent circuit in the d-axis for the three-phase synchronous motor 10 whilst FIG. 8B provides the voltage equivalent circuit in the q-axis for the three-phase synchronous motor 10. In FIG. 8A, the phase voltage in the d-axis is given by:

$$u_d = R_s i_d + L_d \frac{di_d}{dt} - \omega_r L_q i_q.$$

In FIG. 8B, the phase voltage in the q-axis is given by:

$$u_q = R_s i_q + L_q \frac{di_q}{dt} + \omega_r L_d i_d + e_o.$$

Figure 9:
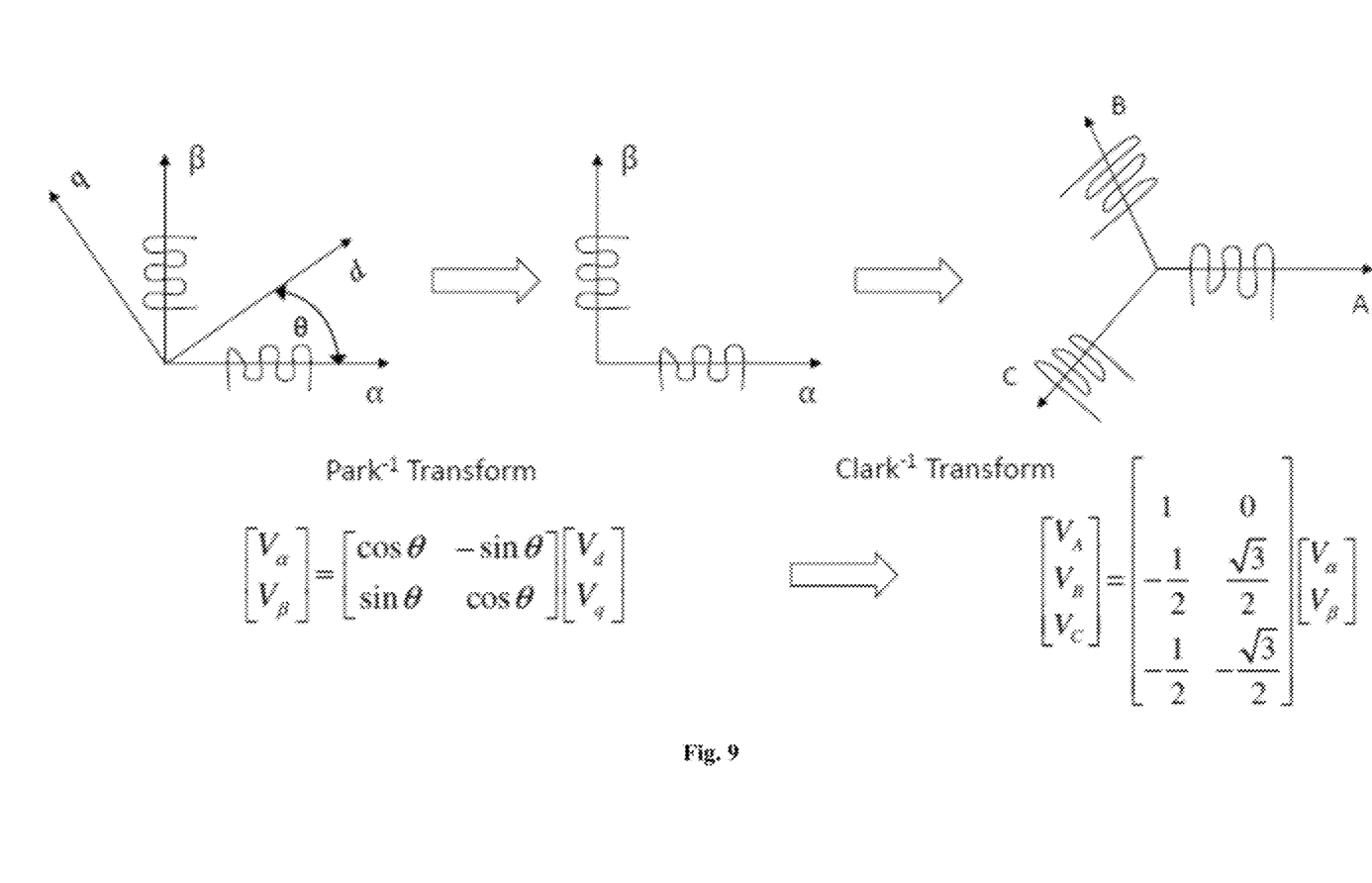
FIG. 9 illustrates the voltage transformation from the d-q coordinate system to the α-β coordinate system in determining the voltages to be applied in the three-phase motor coordinate system for aligning the rotor to a specified angle.

FIG. 9 illustrates the voltage transformation from the synchronously rotating 2D orthogonal reference frame (d-q) to a 2D orthogonal stationary alpha-beta (α-β) motor coordinate system and from the 2D orthogonal stationary alpha-beta (α-β) motor coordinate system to the three-phase coordinate system of the motor 10. The two transformations comprise an inverse Park transformation followed by an inverse Clarke transformation.

Vector control of a synchronous motor can be summarized as follows:

(i) The 3-phase stator currents are measured. These measurements typically provide values for $i_a$ and $i_b$, $i_c$ is calculated because $i_a$, $i_b$ and $i_c$ have the following relationship:

$i_a + i_b + i_c = 0.$ (ii) The 3-phase currents are converted to a two-axis system. This conversion provides the variables $i_\alpha$ and $i_\beta$ from the measured $i_a$ and $i_b$ and the calculated $i_c$ values. $i_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle calculated at the last iteration of the control loop. This conversion provides the $I_d$ and $I_q$ variables from $i_\alpha$ and $i_\beta$. $I_d$ and $I_q$ are the quadrature currents transformed to the rotating coordinate system, a two-dimensional rotating orthogonal reference frame or coordinate system. For steady state conditions, $I_d$ and $I_q$ are constant.

(iv) Error signals are formed using $I_d$, $I_q$ and reference values for each.

The $I_d$ reference controls rotor magnetizing flux.

The $I_q$ reference controls the torque output of the motor.

The error signals are input to PI controllers.

The output of the controllers provide $V_d$ and $V_q$, which is a voltage vector that will be sent to the motor.

(v) A new transformation angle is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the stationary reference frame using the new angle. This calculation provides the next quadrature voltage values $v_\alpha$ and $v_\beta$.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and generating PWM is schematically illustrated in FIG. 3.

If, in the method of the invention, the alignment of the motor 10 in the synchronously rotating 2D orthogonal reference frame (d-q) is considered during steady-state operation, there is no movement or phase current change. Consequently, it is possible to ignore the vector current in the d-axis. It is only necessary in the method of the invention to apply the vector voltage ($V_q$) in the q-axis which is determined from a product of the stator winding resistance ($R_s$) and the stator winding current ($i_q$) in the q-axis, i.e., by:

$$V_q = R_s * i_q.$$

Where θ is the predetermined, selected, or specified rotor angle, the three-phase drive voltages for parking the rotor 12 at rotor angle θ can be determined from $V_q=R_s*i_q$ by firstly applying the inverse Park transformation and then applying the inverse Clarke transformation to yield:

$$V_a = -\sin\theta\, V_q$$

$$V_b = \frac{1}{2}\sin\theta\, V_q + \frac{\sqrt{3}}{2}\cos\theta\, V_q$$

$$V_c = \frac{1}{2}\sin\theta\, V_q - \frac{\sqrt{3}}{2}\cos\theta\, V_q$$

where $V_q$ is set as the force applied at the stator 16 and θ is the rotor alignment angle on stopping of the motor 10. Suitable pulse wave modulated (PMW) drive signals can be generated by the closed-loop controller 100/200 for the synchronous motor 10 from the three-phase voltage equalities for driving respective drive transistors in the power circuit of FIG. 5.

Consequently, the method of the invention provides a method of deriving polyphase drive voltages for aligning the rotor 12 on stopping at the predetermined, selected, or specified rotor angle (θ).

In the method of the invention, only the stator winding current ($i_q$) in the q-axis is used in the step of determining the synchronously rotating reference frame vector voltage ($V_q$). The stator winding current ($i_d$) in the d-axis is ignored.

The invention also provides a closed-loop method of starting the synchronous motor 10 by parking the rotor 12 at the specified rotor angle (θ) on stopping of the motor 10 and subsequently controlling start-up of the motor 10 using the closed-loop motor controller 100/200 with the specified rotor angle (θ) as an input. This solves many problems with conventional synchronous motors having a having a sensorless closed-loop motor controller where the initial start-up position of the rotor is unknown.

The invention also provides a sensorless closed-loop controller 100/200 for a synchronous motor 10 for aligning the rotor 12 on stopping of the motor 10 in accordance with the afore-described method of the invention.

Whilst the method as hereinbefore described has been described with respect to a three-phase synchronous motor 10, the method of the invention may be adapted to other motor configurations as shown in FIGS. 10-13.

Figure 10:
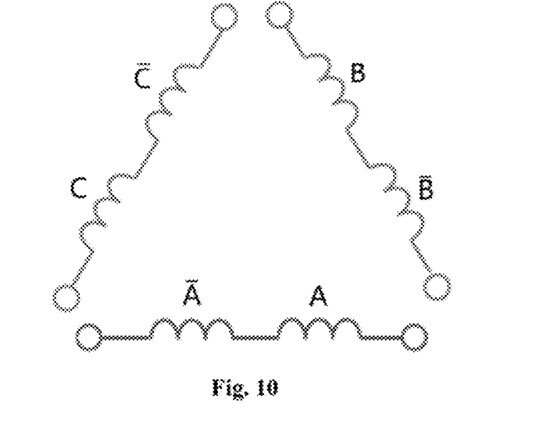
FIG. 10 is a schematic diagram showing a six-wire configuration of stator windings of a three-phase synchronous motor in which the closed-loop start-up method in accordance with the invention can be implemented.
Figure 11:
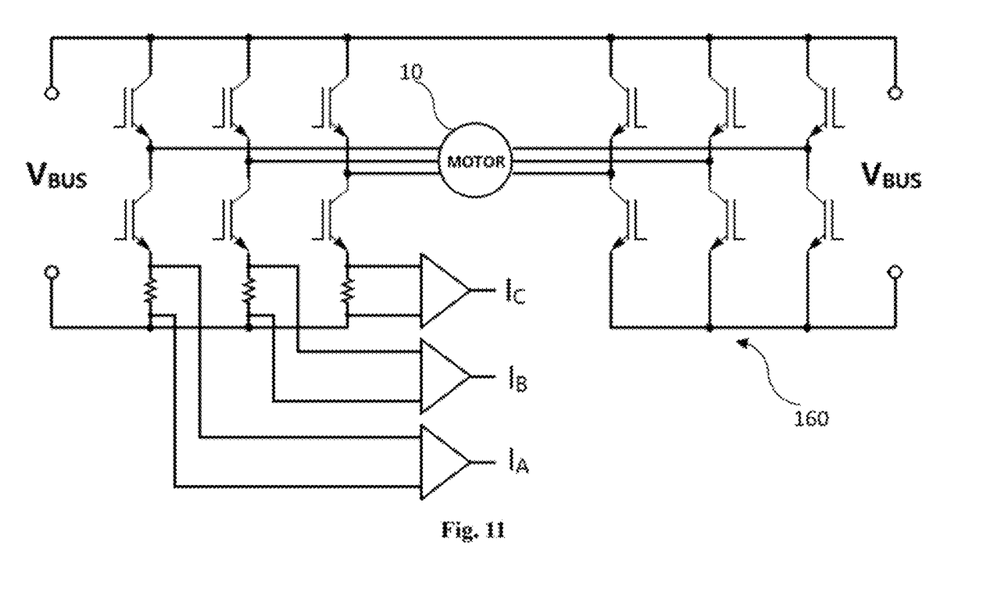
FIG. 11 is a schematic block diagram of a power stage for the closed-loop motor control system in accordance with the invention for the three-phase synchronous motor of FIG. 10.

In contrast to FIG. 4, FIG. 10 provides a schematic diagram showing a six-wire configuration of the stator windings 18 of the synchronous motor 10 whilst FIG. 11 provides a schematic block diagram of a 3-phase power stage/bridge 160 for the closed-loop controller 100/200 for the synchronous motor 10 with this stator winding configuration. The six-wire stator winding configuration results from none of the three stator windings 18 having any common connection points in contrast to the conventional delta or star stator winding configurations of FIG. 4 which have at least one common connection point between at least two of the stator windings 18.

Figure 12:
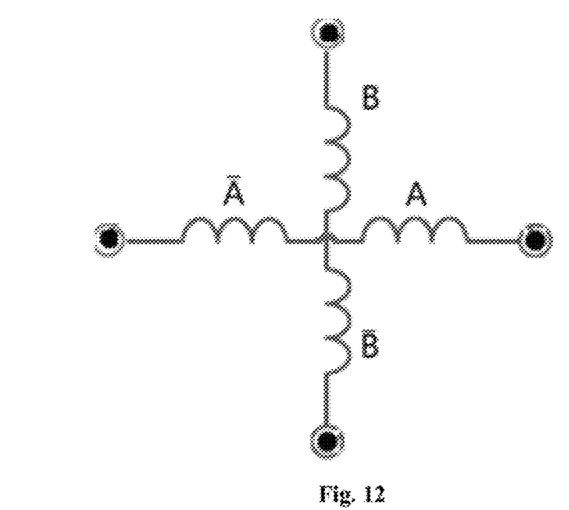
FIG. 12 is a schematic diagram showing a four-wire configuration of stator windings of a synchronous motor in which the closed-loop start-up method in accordance with the invention can be implemented.
Figure 13:
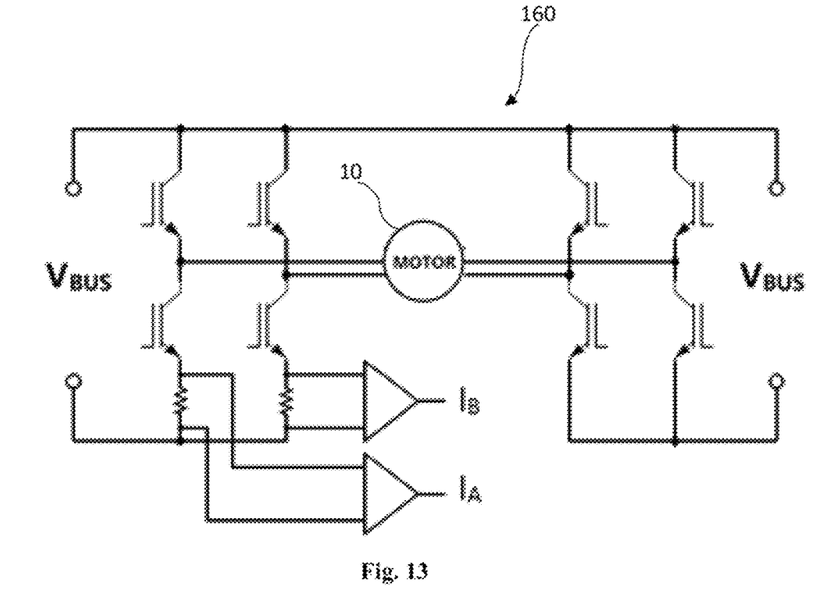
FIG. 13 is a schematic block diagram of a power stage for the closed-loop motor control system in accordance with the invention for the synchronous motor of FIG. 12.

FIG. 12 provides a schematic diagram showing a four-wire configuration of 2-phase stator windings 18 of the synchronous motor 10 in which the closed-loop start-up method in accordance with the invention can be implemented. FIG. 13 provides a schematic block diagram of a power stage/bridge 160 for the closed-loop motor controller 100/200 in which the sensed currents "$I_A$", "$I_B$" are fed into the Clarke Transform module.

The present invention also provides a non-transitory computer-readable medium storing machine-readable instructions, wherein, when the machine-readable instructions are executed by the processor of the closed-loop motor controller 100/200, they configure the processor to implement the concepts of the present invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of aligning a rotor of a polyphase synchronous motor to a predetermined rotor angle, the method comprising the steps of:
   sensing voltages or currents in windings of a stator of the motor during synchronous operation of the motor;
   based on the sensed voltages or currents, determining a synchronously rotating reference frame vector voltage ($V_q$) in a q-axis of a synchronously rotating reference frame as a product of a resistance ($R_s$) of the windings of the stator and a current ($i_q$) in the windings of the stator in the q-axis;
   determining, from the synchronously rotating reference frame vector voltage ($V_q$), corresponding polyphase drive voltages for the motor for a predetermined rotor angle ($\vartheta$) by transforming the synchronously rotating reference frame vector voltage ($V_g$) to an orthogonal stationary alpha-beta ($\alpha$-ß) motor coordinate system and then transforming the orthogonal stationary alpha-beta ($\alpha$-ß) motor coordinate system to a polyphase motor coordinate system; and
   applying the corresponding polyphase drive voltages to align the rotor on stopping the rotor at the predetermined rotor angle ($\vartheta$).

2. The method of claim 1, wherein the sensed currents used in determining the synchronously rotating reference frame vector voltage ($V_q$) comprise only the current ($i_q$) in the q-axis.

3. The method of claim 1, wherein the method further comprises: ignoring a current ($i_d$) in the windings of the stator in a d-axis of the synchronously rotating reference frame when determining the synchronously rotating reference frame vector voltage ($V_q$).

4. The method of claim 1, wherein transforming the synchronously rotating reference frame vector voltage ($V_q$) to the orthogonal stationary alpha-beta ($\alpha$-ß) motor coordinate system comprises: using an inverse Park transformation.

5. The method of claim 1, wherein transforming the orthogonal stationary alpha-beta ($\alpha$-ß) motor coordinate system to the polyphase motor coordinate system comprises: determining the corresponding polyphase drive voltages for the motor for the predetermined rotor angle ($\vartheta$) by using an inverse Clarke transformation.

6. The method of claim 1, further comprising: determining, from the corresponding polyphase drive voltages for the motor for the predetermined rotor angle ($\vartheta$), pulse wave modulated (PWM) signals for driving drive transistors for each phase of the motor to align the rotor on stopping the rotor at the predetermined rotor angle ($\vartheta$).

7. A closed-loop method of starting a synchronous motor having a rotor, the method comprising the steps of:
   sensing voltages or currents in windings of a stator of the motor during synchronous operation of the motor;
   based on the sensed voltages or currents, determining a synchronously rotating reference frame vector voltage ($V_q$) in a q-axis of a synchronously rotating reference frame as a product of a resistance ($R_s$) of the windings of the stator and a current ($i_q$) in the windings of the stator in the q-axis;
   determining, from the synchronously rotating reference frame vector voltage ($V_q$), corresponding polyphase drive voltages for the motor for a predetermined rotor angle ($\vartheta$) by transforming the synchronously rotating reference frame vector voltage ($V_g$) to an orthogonal stationary alpha-beta ($\alpha$-ß) motor coordinate system and then transforming the orthogonal stationary alpha-beta ($\alpha$-ß) motor coordinate system to a polyphase motor coordinate system;
   applying the corresponding polyphase drive voltages to align the rotor on stopping the rotor at the predetermined rotor angle ($\vartheta$); and
   controlling start-up of the motor using a closed-loop synchronous operation motor control algorithm based on the predetermined rotor angle ($\vartheta$).

8. The method of claim 7, wherein the sensed currents used in determining the synchronously rotating reference frame vector voltage ($V_q$) comprise only the current ($i_q$) in the q-axis.

9. The method of claim 7, wherein the method further comprises: ignoring a current ($i_d$) in the windings of the stator in a d-axis of the synchronously rotating reference frame when determining the synchronously rotating reference frame vector voltage ($V_q$).

10. The method of claim 7, wherein transforming the synchronously rotating reference frame vector voltage ($V_q$) to the orthogonal stationary alpha-beta ($\alpha$-ß) motor coordinate system comprises: using an inverse Park transformation.

11. The method of claim 7, wherein transforming the orthogonal stationary alpha-beta ($\alpha$-ß) motor coordinate system to the polyphase motor coordinate system comprises: determining the corresponding polyphase drive voltages for the motor for the predetermined rotor angle ($\vartheta$) by using an inverse Clarke transformation.

12. The method of claim 7, further comprising: determining, from the corresponding polyphase drive voltages for the motor for the predetermined rotor angle ($\vartheta$), pulse wave modulated (PWM) signals for driving drive transistors for each phase of the motor to align the rotor on stopping the rotor at the predetermined rotor angle ($\vartheta$).

13. A closed-loop controller for a synchronous motor having a rotor, the controller comprising a non-transitory computer-readable medium storing machine-readable instructions and a processor, wherein, when executed by the processor, the machine-readable instructions configure the controller to park the rotor at a specified rotor angle ($\vartheta$) by:
   sensing voltages or currents in windings of a stator of the motor during synchronous operation of the motor;
   based on the sensed voltages or currents, determining a synchronously rotating reference frame vector voltage ($V_q$) in a q-axis of a synchronously rotating reference frame as a product of a resistance ($R_s$) of the windings of the stator and a current ($i_q$) in the windings of the stator in the q-axis;
   determining, from the synchronously rotating reference frame vector voltage ($V_q$), corresponding polyphase drive voltages for the motor for a predetermined rotor angle ($\vartheta$) by transforming the synchronously rotating reference frame vector voltage ($V_q$) to an orthogonal stationary alpha-beta ($\alpha$-ß) motor coordinate system and then transforming the orthogonal stationary alpha-beta (α-ß) motor coordinate system to a polyphase motor coordinate system; and applying the corresponding polyphase drive voltages to align the rotor on stopping the rotor at the predetermined rotor angle (ϑ).

14. The closed-loop controller of claim 13, wherein the motor is any of a brushless DC (BLDC) motor or a permanent magnet synchronous motor (PMSM).

15. The closed-loop controller of claim 13, wherein the motor comprises a three-wire stator configuration, a four-wire stator configuration, or a six-wire stator configuration.

16. The closed-loop controller of claim 13, wherein the sensed currents used in determining the synchronously rotating reference frame vector voltage ($V_q$) comprise only the current ($i_q$) in the q-axis.

17. The closed-loop controller of claim 13, wherein the method further comprises: ignoring a current ($i_d$) in the windings of the stator in a d-axis of the synchronously rotating reference frame when determining the synchronously rotating reference frame vector voltage ($V_q$).

18. The closed-loop controller of claim 13, wherein transforming the synchronously rotating reference frame vector voltage ($V_q$) to the orthogonal stationary alpha-beta (α-ß) motor coordinate system comprises: using an inverse Park transformation.

19. The closed-loop controller of claim 13, wherein transforming the orthogonal stationary alpha-beta (α-ß) motor coordinate system to the polyphase motor coordinate system comprises: determining the corresponding polyphase drive voltages for the motor for the predetermined rotor angle (ϑ) by using an inverse Clarke transformation.

20. The closed-loop controller of claim 13, further comprising: determining, from the corresponding polyphase drive voltages for the motor for the predetermined rotor angle (ϑ), pulse wave modulated (PWM) signals for driving drive transistors for each phase of the motor to align the rotor on stopping the rotor at the predetermined rotor angle (ϑ).

* * * * *